(12) United States Patent
Kokkelink et al.

(10) Patent No.: US 6,430,323 B1
(45) Date of Patent: Aug. 6, 2002

(54) POLARIZATION MAINTAINING OPTICAL ISOLATORS

(75) Inventors: Jan W. Kokkelink, Blairstown; Talal K. Findakly, Hackettstown, both of NJ (US)

(73) Assignee: Micro-Optics, Inc., Hackettstown, NJ (US)

(*) Notice: Subject to any disclaimer, the term of this patent is extended or adjusted under 35 U.S.C. 154(b) by 34 days.

(21) Appl. No.: 09/692,033

(22) Filed: Oct. 19, 2000

Related U.S. Application Data

(60) Provisional application No. 60/160,513, filed on Oct. 20, 1999, and provisional application No. 60/160,515, filed on Oct. 20, 1999.

(51) Int. Cl.[7] .............................. G02B 6/00; G02F 1/09
(52) U.S. Cl. .............................. 385/11; 385/33; 385/6; 385/36; 385/31; 359/280; 359/281; 359/282; 359/283
(58) Field of Search ................................. 385/11, 33, 6, 385/36, 31; 359/281, 280, 282, 283

(56) References Cited

U.S. PATENT DOCUMENTS

| | | | | |
|---|---|---|---|---|
| 4,712,880 A | * | 12/1987 | Shirasaki | 350/377 |
| 5,402,509 A | * | 3/1995 | Fukushima | 385/33 |
| 5,408,354 A | * | 4/1995 | Hosokawa | 359/281 |

* cited by examiner

*Primary Examiner*—Brian Healy
(74) *Attorney, Agent, or Firm*—Michael W. Ferrell

(57) ABSTRACT

Optical isolators for use in fiber optic networks utilizing a birefringent wedge set with a Faraday rotator disposed between the birefringent wedges. In a first embodiment a polarization maintaining optical isolator is disclosed which will maintain the polarization of the light which passes through it in a forward direction and block light in the reverse direction. In a second embodiment a single polarization optical isolator is disclosed which will pass only a single linear polarization of the light in a forward direction and block any light in the reverse direction.

8 Claims, 2 Drawing Sheets

POLARIZATION MAINTAINING OPTICAL ISOLATORS

CROSS REFERENCE TO RELATED APPLICATIONS

This application claims the benefit of the filing date of U.S. provisional patent applications Serial Nos. 60/160,513 and 60/160,515, both filed Oct. 20, 1999.

BACKGROUND AND SUMMARY OF THE INVENTION

The present invention is directed to optical components for use in fiber optic networks and particularly to devices known as optical isolators, and more particularly to polarization maintaining optical isolators and single polarization optical isolators.

Fiber optic communication systems rely on the use of coherent light from optical sources such as semiconductor lasers to carry optical signals. High quality transmission require sources that are stable with low noise. As the optical wave leaves the optical source and travels through the fiber optic transmission system, it encounters discontinuities at various points causing reflections. If such reflections are fed back into the source (laser), they cause instabilities which are detrimental to the performance of the source (laser) and the transmission system. Optical isolators provide a solution to this problem by allowing unobstructed flow of optical power in the forward or transmission direction while blocking all backward reflections or transmission. Therefore, by placing an isolator after the optical source, the source (laser) will be protected from backward reflections.

A commonly used isolator in fiber optic transmission systems is of the so called single polarization (SP) type. Isolation in single polarization optical isolators is achieved through manipulation of the polarization angle of the light wave. In its simplest form, a SP isolator consists of a non-reciprocal magneto-optical polarization rotation component (commonly known as a Faraday rotator), placed between two linear light polarizers, aligned such that their principal axis are at 45° from each other. As light enters the isolator in the forward direction, it becomes polarized along the polarization axis of the input polarizer. The Faraday rotator rotates the polarization by 45°, bringing it in parallel with the polarization axis of the output polarizer. Therefore, the input optical power flows unobstructed in the forward direction.

In the backward direction, light enters the output end of the isolator and the output polarizer filters out all polarization states except the state parallel to the output polarizer, As it travels through the Faraday rotator, it undergoes an additional rotation of 45° resulting in a polarization state at 90° with respect to the input polarizer. The input polarizer therefore blocks, the remaining light, in the backward direction. This product does not provide transmission in the second orthogonal polarization which is why it is referred to as a "single polarization", i.e. the output of this device will be light having only a single linear polarization and light having a polarization orthogonal to that of the first linear polarizer will not pass through the device, it does however provide isolation for both polarization states.

In a first embodiment of this invention, a true polarization maintaining isolator is disclosed. It allows transmission and isolation along the two orthogonal states of polarization (through a polarization maintaining fiber, for example). The polarization maintaining isolator of the present invention uses birefringent wedges. In the device, a nonreciprocal 45° Faraday rotating film is placed in between two birefringent wedges having their optical axis at 45° from each other. Lenses are used at the input and output ends to couple light out of and into an input and output polarization maintaining (PM) fibers. The major axis of the input PM fiber is aligned parallel to the optic axis of the first (or input) birefringent wedge. The major axis of the output PM fiber is aligned parallel to the optic axis of the second (or output) birefringent wedge. Because of the alignment of the axes of the fibers to the OA's of the birefringent wedges, the amount of power in each axis (or polarization state) is maintained when transmitting through this isolator. In the reverse direction of this device, all polarization states will be blocked.

In a second embodiment of this invention a compact single polarization isolator that does not utilize a linear polarizer is disclosed. A non-reciprocal polarization rotating element having an optical polarization rotation angle of 45° is placed in the optical path between two birefringent wedges that are aligned with their optical axis at 45° from each other. In this configuration, the two orthogonal states of polarization of the incoming light beam will exit the output wedge with their polarization state switched with respect to the output birefringent wedge's optic axis and separated by an angle. A pair of lenses are used to collimate the optical beam in the polarization rotating element region of the device and couple light into and out of the input and output fibers. With a linearly polarized light input by the input fiber (which can be a polarization maintaining fiber), the output fiber (which can also be a polarization maintaining fiber) is aligned (positioned with respect to the output lens) so that only one of the two polarization states is coupled (lensed) into it.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Figure 1A:
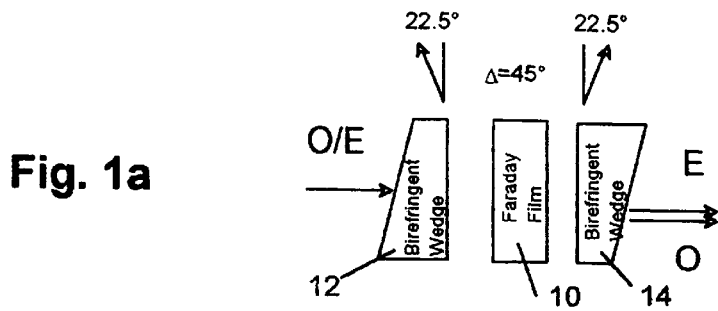
FIGS. 1a and 1b illustrates the operation of a birefringent wedges and Faraday rotator unit which forms the optical isolating component of the present invention.
Figure 1B:
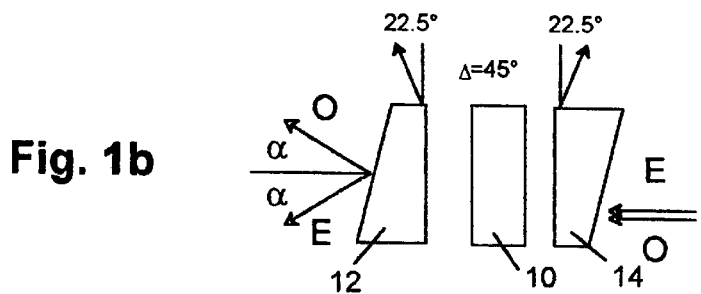

The principle of operation of the device is shown in FIGS. 1a and 1b. A nonreciprocal 45° Faraday rotating film 10 is placed in between two birefringent wedges 12,14 having their optical axis at 45° from each other and with the optical axes perpendicular to the direction of light propagation, and with the base of wedge 12 disposed downwardly and the base of wedge 14 disposed upwardly (i.e. one wedge is inverted with respect to the other). As illustrated the optical axis of birefringent wedge 12 is rotated 22.5° degrees out of the plane of the paper and that of birefringent wedge 14 is rotated 22.5° into the plane of the paper. In the forward (transmission) direction shown in Figure 1a, birefringent wedge 12 splits the input light beam into two orthogonal states of polarization, extraordinary "E" and ordinary "O" beams. Faraday rotating film 10 rotates both "E" and "O" beams by 45° Because the optic axis of birefringent wedge 14 is at 45° from the first, the "E" and "O" polarizations travel through birefringent wedge 14 as "E" and "O" (i.e. they maintain their respective input polarization state with respect to wedge 14) and therefore exit wedge 14 in a direction parallel to each other.

In the backward or reverse direction as shown in FIG. 1b, birefringent wedge 14 splits the beam in two orthogonal ("E" and "O") polarizations. After passing through Faraday rotating film 10 (which rotates both polarizations by 45° in the same direction—Note: viewed along the direction of the light beam the rotation caused by Faraday rotating film 10 is clockwise going forward and counterclockwise going in reverse) the "E" beam becomes "O" and the "O" beam becomes "E", with respect to the considered wedges. Because of this, the two beams exit birefringent wedge 12 not in parallel with each other but separated from each other (and from the input beam) by an angle α and so will not couple back into the input fiber. Suitable birefringent materials for wedges 14,16 include, but are not limited to, lithium niobate ($LiNbO_3$), rutile ($TiO_2$), and yttrium vanadate ($YVO_4$).

Polarization Maintaining Optical Isolator

Figure 2A:
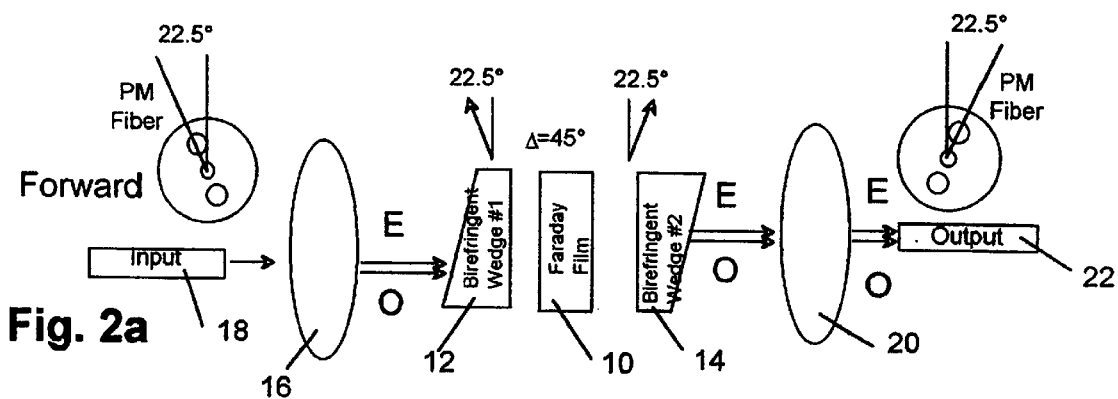
FIGS. 2a and 2b illustrates the components of a polarization maintaining optical isolator embodiment of the present invention.
Figure 2B:
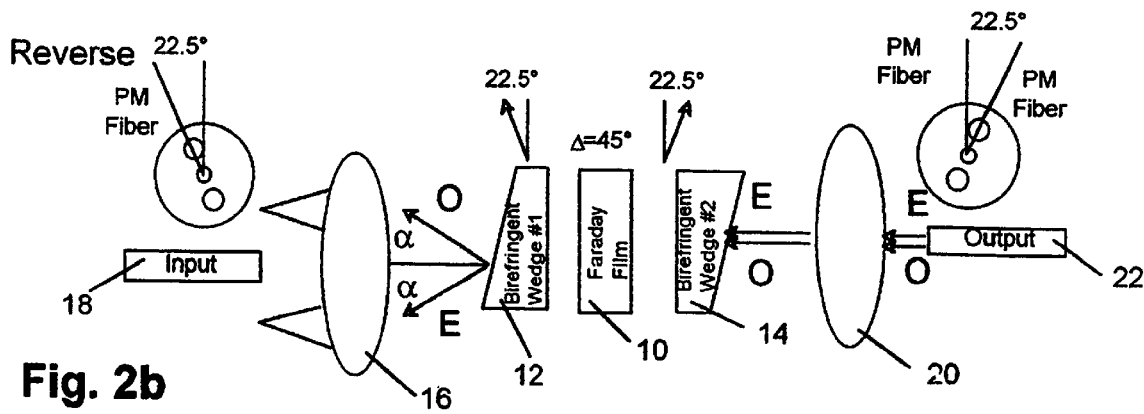

FIGS. 2a and 2b illustrates the components of a polarization maintaining optical isolator embodiment of the present invention based on the birefringent wedges and nonreciprocal 45° Faraday rotating film shown in FIGS. 1a and 1b. An input collimating lens 16 is used couple light into an input polarization maintaining (PM) fiber 18 and an collimating output lens 20 is used couple light into an output polarization maintaining fiber 22. The major axis (illustrated schematically above the fiber) of input PM fiber 18 is aligned parallel to the optic axis of birefringent wedge 12 and the major axis of output PM fiber 22 is aligned parallel to the optic axis of birefringent wedge 14. The actual direction of orientation of the optical axes of birefringent wedges 14,16 is not critical as long as the optical axes of the two wedges are at 45° from each other, perpendicular to the light propagation direction and aligned with their respective input and output fibers. Collimating lenses 16,20 may be of the usual types used in fiber optic systems such as graded index (GRIN) lenses.

The forward direction is shown if FIG. 2a in this configuration birefringent wedges 12,14 and Faraday rotating film 10 serve to split into two orthogonal polarization states and recombine the input beam as it exits birefringent wedge 14, so that the recombined beam is directed to output fiber 22 by output lens 20. In the reverse direction shown in FIG. 2b the configuration of birefringent wedges 12,14 and Faraday rotating film 10 is such that when the beam exits birefringent wedge 12 not parallel but separated from each other (and from the input beam) by an angle a so that input lens 16 will image both polarizations away from input fiber 18, thus providing isolation of input fiber 18 from a beam launched from output fiber 22. Because of the alignment of the axes of the fibers to the axes of the birefringent wedges, no coupling of power between the orthogonal polarization states occurs, effectively resulting in a undisturbed flow of light between the input and output polarization maintaining fibers.

Single Polarization Optical Isolator

In a second embodiment of this invention a single polarization isolator 30 is disclosed, which again includes a pair of birefringent crystal wedges 32,34 whose optic axis are at (−45°) from each other and with their optical axes perpendicular to the direction of light propagation, with the base of wedge 32 disposed upwardly and the base of wedge 34 disposed downwardly (Note: this is the opposite of the orientation of the wedges 12,14 of the isolator of FIG. 2, put another way the input beam is effectively traveling in the direction shown FIG. 1b. A non-reciprocal 45° Faraday rotating element 36 is placed between wedges 32,34. An input lens 38 is used couple light into an input polarization maintaining (PM) fiber 40 and an output lens 42 is used to couple light into an output polarization maintaining fiber 44. The major axis of input PM fiber 40 is aligned parallel to the optic axis of birefringent wedge 32 and the major axis of output PM fiber 44 is aligned perpendicular to the optic axis of birefringent wedge 34. The actual direction of orientation of the optical axes of birefringent wedges 14,16 is again not critical as long as the optical axes of the two wedges are at 45° from each other and aligned with their respective input and output fibers.

Figure 3A:
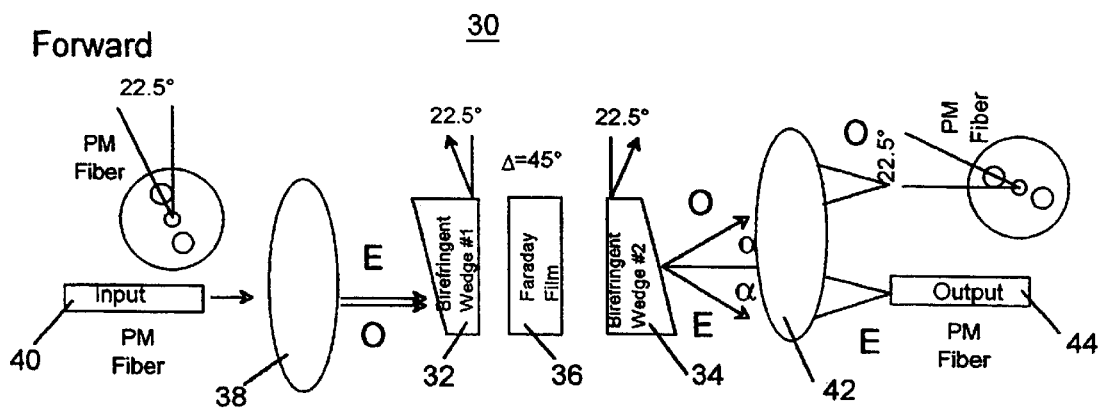
FIGS. 3a and 3b illustrates the components of a single polarization optical isolator embodiment of the present invention

In the forward (transmission) direction shown in FIG. 3a, birefringent wedge 32 splits the input light into extraordinary "E" and ordinary "O" beams. The FR film 36 rotates both "E" and "O" beams by 45°. Because the optic axis of birefringent wedge 34 is at 45° from that of wedge 32, the "E" and "O" polarizations travel through birefringent wedge 34 as "O" and "E" (i.e. they switch their respective polarization state) and therefore exit wedge 34 separated by an angle from each other and at an angle a with respect to the input beam. Output lens 42 forms two separate images for these two beams and as output fiber 44 is positioned to capture only one of the two beams, the other is lost. Therefore, in the forward direction, transmission of only one polarization state is allowed through output fiber 44.

Figure 3B:
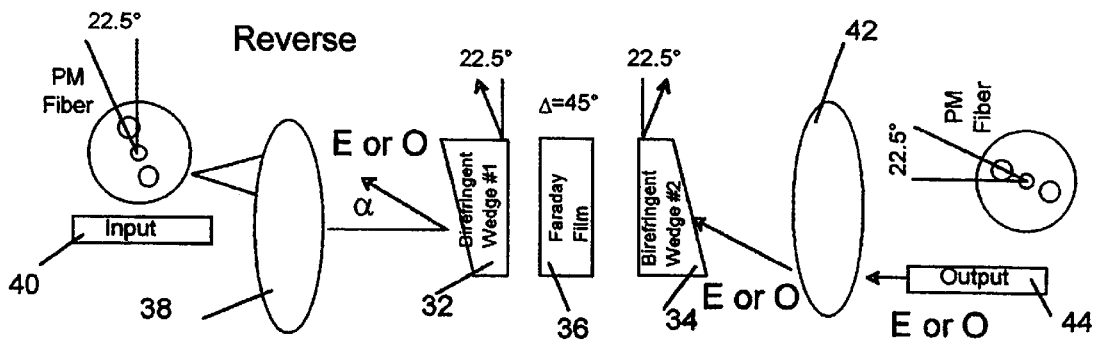

In the backward direction shown in FIG. 3b, the second birefringent wedge 34 splits any beam in two orthogonal ("E" and "O") polarizations. After passing through FR film 36 (which rotates both polarizations by 45° in the same direction), the "E" and "O" beam remain as "E" and "O" (with respect to the wedges considered) beams as they travel through birefringent wedge 32 since its optic axis is at 45° from the second (making the total rotation 0° with respect to the optic axis of that wedge). Because of this, the "E" and "O" beams exit birefringent wedge 32 parallel to each other but at an angle to the input beam, this prevents these beams from coupling back into input fiber 40 as the image is formed outside of input fiber 40.

The isolators described herein have used PM input and output fibers with their optic axis aligned with the optic axes of their respective birefringent wedges, which will minimize the effects of the phase shift that occurs between the two polarization states when they travel through the birefringent wedges (this is called PMD: polarization mode dispersion). The use of PM input and output fibers with their optic axis aligned with the optic axes of their respective birefringent wedges assures maximum performance of the isolators by eliminating power coupling from one polarization state to the other. However the use of a single mode fibers, particularly as the output fiber, in certain applications, may provide adequate performance with single polarization isolators.

The above described isolators provides a substantially symmetrical beam splitting, however, it is to be understood that other birefringent wedge configurations providing non-symmetrical beam splitting can also be used in this invention. It is also to be noted that optical isolators using birefringent wedges with their optic axes disposed at other than 45° to each other can be designed with the use of a waveplate as an additional component.

A The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A polarization maintaining optical isolator for transmitting an input light beam from an input optical fiber to an output optical fiber, while preventing light transmission from said output fiber to said input fiber, said polarization maintaining optical isolator comprising:

a birefringent wedge set having first and second birefringent wedges, wherein said first birefringent wedge has an optical axis disposed at 45° to the optical axis of the second birefringent wedge and perpendicular to the light propagation direction, with the bases of the birefringent wedges being oppositely disposed;

a nonreciprocal 45° polarization rotating film disposed between said first and second birefringent wedges;

a polarization maintaining input optical fiber having its major axis aligned with the optical axis of the first birefringent wedge;

an input lens for collating and directing the light from the input optical fiber onto the birefringent wedge set;

a polarization maintaining output fiber having its major axis aligned parallel to the optical axis of the second birefringent wedge;

an output lens for collating and directing the light from said birefringent wedge set into the output fiber; and said birefringent wedge set and said nonreciprocal 45° polarization rotating film splitting a light beam originating from said input fiber into first and second beams, said first beam having a linear polarization which is orthogonal to the polarization state of the second output beam and thereafter recombining said first and second beams such that they are parallel and collinear with each other; said birefringent wedge set and said nonreciprocal 45° polarization rotating film splitting a light beam originating from said output fiber into first and second beams, said first bean having a linear polarization which is orthogonal to the polarization state of the second output beam and thereafter directing said output beams at an angle such that neither beam will impinge upon the input fiber.

2. The optical isolator as claimed in claim 1 wherein at least one of the input and output lenses comprise graded index lenses.

3. The optical isolator as claimed in claim 1 wherein the input and output fibers are parallel to each other.

4. The optical isolator as claimed in claim 2 wherein the birefringent wedges are selected from the group consisting of lithium niobate (LiNbO3), rutile (TiO2), and yttrium vanadate (YVO4).

5. A single polarization maintaining optical isolator for transmitting an input light beam from an input optical fiber to an output beam having a single linear polarization, while preventing light transmission from said output fiber to said input fiber, said single polarization optical isolator comprising:

a birefringent wedge set having first and second birefringent wedges, wherein said first birefringent wedge has an optical axis disposed at 45° to the optical axis of the second birefringent wedge and perpendicular to the light propagation direction, with the bases of the birefringent wedges being oppositely disposed;

a nonreciprocal 45° polarization rotating film disposed between said first and second birefringent wedges;

a polarization maintaining input optical fiber having its major axis aligned with the optical axis of the first birefringent wedge;

an input lens for collating and directing the light from the input optical fiber onto the birefringent wedge set;

said birefringent wedge set and said nonreciprocal 45° polarization rotating film being constructed and arranged to split a light beam originating from said input fiber into first and second beams, said first beam having a linear polarization which is orthogonal to the polarization state of the second output beam and said first and second beams exiting said second birefringent wedge at an angle with respect to each other;

a polarization maintaining output optical fiber having its major axis aligned perpendicular to the optical axis of the second birefringent wedge;

an output lens for collating and directing the light from said birefringent wedge set into the output fiber which is positioned to intercept one of the beams exiting said extend birefringent wedge; and said birefringent wedge set and said nonreciprocal 45° polarization rotating film splitting a light beam originating from said output fiber into first and second beams, said first beam having a linear polarization which is orthogonal to the polarization state of the second output beam and thereafter directing said output beams at an angle such that neither beam will impinge upon the input fiber.

6. The optical isolator as claimed in claim 5 wherein at least one of the input and output lenses comprise graded index lenses.

7. The optical isolator as claimed in claim 5 wherein the input and output fibers are parallel to each other.

8. The optical isolator as claimed in claim 5 wherein the birefringent wedges are selected from the group consisting of lithium niobate (LiNbO3), rutile (TiO2), and yttrium vanadate (YVO4).

* * * * *